June 25, 1968    SATSURO UMEDA    3,390,360
CURRENT AND TEMPERATURE RESPONSIVE MAGNETIC CONTROL DEVICE
Filed Jan. 15, 1965
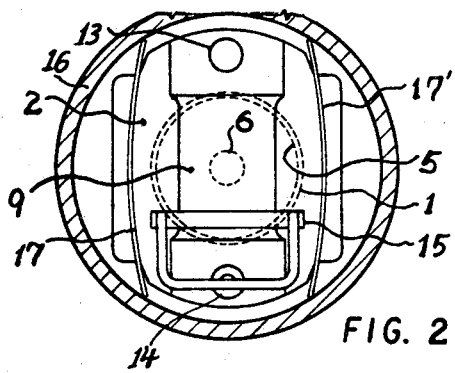
FIG. 1
FIG. 2
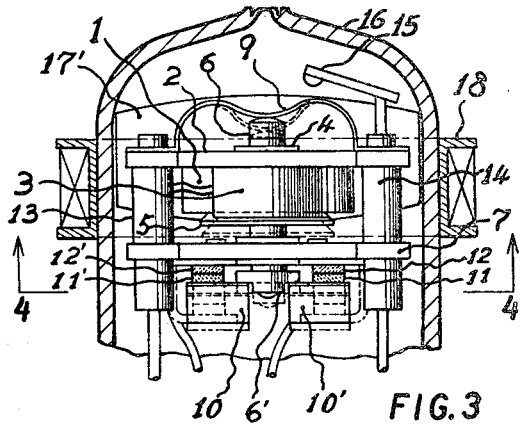
FIG. 3
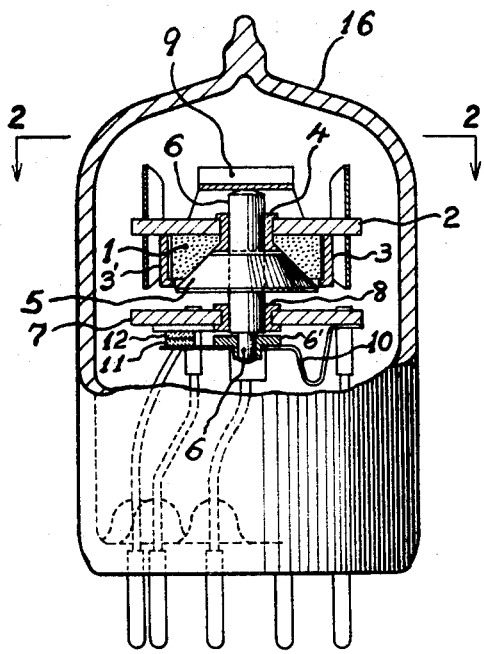
FIG. 4
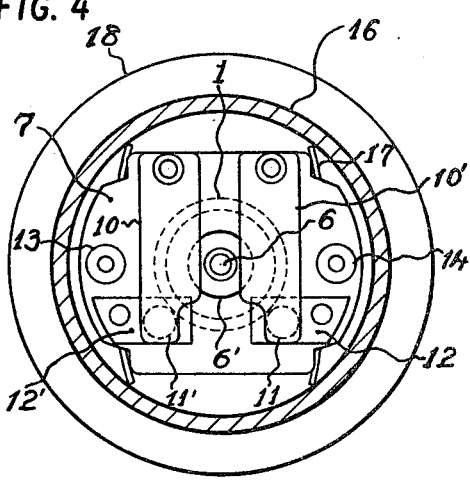
FIG. 6
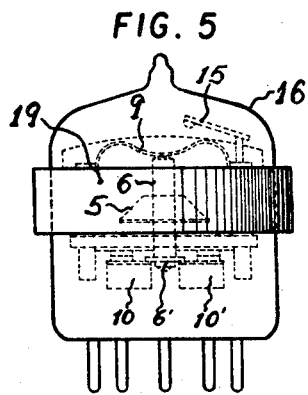
FIG. 5
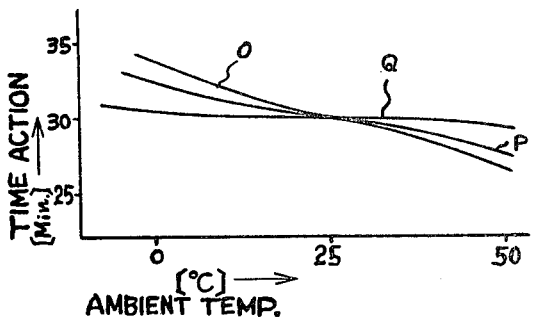
INVENTOR.
Satsuro Umeda
By Wenderoth, Lind & Ponack
attorneys

United States Patent Office 3,390,360
Patented June 25, 1968

3,390,360
CURRENT AND TEMPERATURE RESPONSIVE
MAGNETIC CONTROL DEVICE
Satsuro Umeda, 2/23 2-chome Uehara, Shibuya-ku, Tokyo, Japan
Filed Jan. 15, 1965, Ser. No. 425,754
Claims priority, application Japan, Aug. 27, 1964, 39/48,124
5 Claims. (Cl. 335—146)

This invention relates to a magnetic control tube.

The principal object of this invention is to provide a time limit switch which utilizes the current-magnetism characteristics of a solid element for actuation without the aid of a motor, a toothed gear, link motion or the like.

Another object of the invention is to provide autonomous temperature control by means of a greatly simplified construction.

A further object of the invention is to provide an exact time delay control of a heating and cooling cycle by using a thermally sensitive control element which is very sensitive to the influence of the ambient and/or contacted body temperature.

The magnetic control tube of the invention comprises a main thermally sensitive control element which is composed of at least one oxidized solid solution element and a pair of silver electrodes, which element is mounted in an evacuated tube in which the main element is coupled with at least one permanent magnet and actuates a spring element against the attraction force of the magnetic field of the permanent magnet. The said main element can be given a predetermined negative coefficient of resistance and negative ferrimagnetism characteristics so that it will operate along the desired temperature gradients for the respective operating conditions, and one of the most remarkable features is that it has a minimized tolerance in delay time operation and is not influenced by the environmental temperature. On the other hand, this tube can perform autonomous control operations involving a timing change by connecting an external thermal sensitive body with the thermally sensitive control element and/or by means of the temperature of air. In both such types of opertion, the delay switching will depend on the initial current value with which the device is energized and the tension of the spring incorporated therein, and in addition on magnetic material attached around the outside of the device. This material is initially adjustably mounted on the completed magnetic control tube and is slidable in order to adjust the magnetic field within the tube, and should be fixed in a final position by means of a bonding material during a first inspection process. When the above initial current is impressed upon the device, the current over a period of time increases up to the necessary intensity for operating the relay. The relay controlled heating or cooling is performed upon heat sensitive materials, and the thermal constant and temperature coefficient thereof determines the time factor of the further relay operation.

The magnetic control tube time delay device according to the invention is a modified device to be used for special purposes such as to take advantage of the thermal property of a ferrimagnetism-thermistor device which comprises a new oxidized solid state material having a negative temperature resistance coefficient and a negative ferrimagnetism characteristic, which material is sintered and is a perfectly diffused component mainly of $Fe_2O_3$, at least one divalent transition metal, and zinc. It is made by a method comprising the steps of completely and thoroughly mixing iron oxide powder as a suspension into a solution of a readily soluble compound taken from the group consisting of acetates, oxalates, chlorides, nitrates and carbonates of divalent transition metals in a solute taken from the group consisting of water and alcohol. This solution with the suspension therein is used as a starting material, and is treated as set forth in my copending U. S. patent applications Ser. No. 285,094, now abandoned, and Ser. No. 425,661. This material is then mounted on a spring which moves against the force of attraction of a permanent magnet, and is also connected to a switch construction.

Various structures incorporating the device are possible depending on the objects to be achieved. Some of these are as follows:

The material on the outside of the tube can be a solenoid coil connected in series with the main electrode. A ring of pure iron can also be used in order to delay time operation and/or delay time cycling, so that it is possible to choose the characteristics of the device almost at will.

When the device is used as a thermistor, it is possible to operate under very cool conditions, such as minus 30° C., with basic current flowing.

When only a time delay function is desired, an optimum current flow can be maintained in the thermally sensitive control element, or ferrimagnetism-thermistor element, and this condition will last until the main switch is turned off. When a time delay cycling occurs, the current flow is automatically turned off by the motion of the device due to self-heating causing a decrease in magnetism, and cooling occurs under natural or ambient conditions, so that the force of magnetic attraction is again increased. The material is thus attracted by the permanent magnet, and the self-heating cycle occurs again. Such cycling motion can be used to control electric circuits.

In the present device, any correction and regulation of the operation of the device after the completion of its glass tube is carried out solely from outside of the tube because of the presence of the evacuated glass envelope. That is, regulation of performance characteristics is carried out by means of magnetic regulation with a magnetic material, a solenoid coil etc. inserted around the tube, and in some cases emphasis is placed on minimizing the deviations from normal of the performance of the device by such means.

The invention will be better understood and the above objects of the invention will become apparent from the following description taken in connection with the appended drawing in which:

FIG. 1 is a side elevational view of the device, partly broken away, in which its principal parts are shown in section;

FIG. 2 is a sectional view taken on line A—A of FIG. 1;

FIG. 3 is a side elevational view of the upper part of the device of FIG. 1 taken in a direction perpendicular to that in FIG. 1 and with an adjusting magnetic member thereon;

FIG. 4 is a sectional view taken on line B—B of FIG. 3;

FIG. 5 is a side elevational view of a device with a magnetic member therearound; and FIG. 6 is a graph showing the performance of the device.

Referring now to the accompanying drawings, FIGS. 1 and 2 show an embodiment of a magnetic control tube according to the invention, in which a member 1 of magnetic material composed of a solid solution of oxides in form of cylinder and having a negative temperature coefficient of magnetism has a concave hole having a suitable angle of inclination therein is held against an upper base plate 2 of insulating material by an eyelet-like guide sleeve 4 which has a central bore. Terminal supporting plates 3 and 3' depend from plate 2 and clamp under the edges of member 1. A permanent magnet 5 having a conical exterior surface corresponding in shape to the concave hole in the member 1 is mounted on the central part of an axle 6. Axle 6 has an insulator 6' on the lower end thereof and a round permanent magnet 5 is firmly attached to the central portion of axle 6. The magnetic poles of the magnet 5 are on the top and bottom thereof so that the magnetic force attracts the member 1 in the direction of axle 6. Axle 6 is slidable upwardly and downwardly in the guide sleeve 4 in the upper base plate 2 and in a guide sleeve 8 mounted in the lower base plate 7 which is also of insulating material.

Upper base plate 2 has mounted thereon a plate spring 9 of non-magnetic stainless steel, such as 18–8 stainless steel, which is electrically insulated from struts 13 and 14 and a part of spring 9 bears against the end of the movable axle 6. The lower end of axle 6 projects through the hole in guide sleeve 8 in the lower base plate 7, and insulator 6' contacts resiliently movable pieces 10 and 10' mounted on the lower base plate 7. The movable pieces 10 and 10', a further plurality of which can be provided as the occasion demands, have suitable metal contacts 11 and 11' thereon to contact opposed metal contacts 12 and 12' respectively mounted on lower base plate 7. Struts 13 and 14 extend between upper and lower base plates 2 and 7 and have pins extending from them through the glass envelope 16. Strut 13 is electrically connected to supporting plate 3 and strut 14 is electrically connected to plate 3'. A getter 15 is mounted on strut 14, and to simplify the construction the strut is used as an electric conductor. The upper and lower base plates are made of steatite, mica or the like depending on the specifications which must be met, while the glass envelope 16 is a conventional sub-minature, seven-pin, none-pin or GT tube selected according to the specifications and manufactured by positioning mica sheets 17 thereon to position the other elements and flashing the getter to obtain a vacuum of at least $2\times10^{-6}$ mm. Hg. Sometimes the getter is separately heated by electricity so as not to influence the characteristics of the magnetic material 1.

In operation, the permanent magnet 5, which is normally against member 1, is drawn toward the member 1 against the resistance of the spring 9 bearing on the end of axle 6, and the contacts 11 and 11' and the fixed contacts 12 and 12' respectively, which are biased toward the open position under pressure under the effect of the resilience of the movable pieces 10 and 10' are closed. Current is fed to the load through contacts 11 and 12, and 11' and 12'. Self heating of member 1 occurs at a velocity corresponding to an initial current through the member 1 and supplied through the pins connected to struts 13 and 14, and when the magnetism has decreased due to the increased temperature of member 1 the movable contacts 11 and 11' are separated from the fixed contacts 12 and 12' by the tension of the spring 9.

An operating sequence the reverse of the foregoing is also possible, and depends on the disposition of contacts. That is, it is possible to arrange the various parts so that the contacts 11 and 11' normally do not contact the fixed contacts 12 and 12' respectively while the permanent magnet 5 is held against the member 1 by the force of attraction between them, so that when a current is passed through the member 1 between the terminals 3 and 3', the force of attraction decreases and the permanent magnet 5 and the member separate under the force of the spring 9 and the contacts 11 and 12, and 11' and 12' close. Also the precision can be increased by making the spring 9 a bimetallic spring.

FIGS. 3 and 4 show a solenoid coil 18, for example of copper wire, mounted on the outside of the tube for adjustment of the magnetic temperature characteristics of member 1. It is possible solely by means of the coil by regulating the current in the coil, to adjust the magnetic field by connecting the coil to the member 1, to thus use the coil as a means for adjusting the time limit of operation of the device. Connecting the solenoid coil in series with the member 1 through one of the pins of the struts 12 and 13 makes possible adjustment of the temperature coefficient of member 1 by means of the copper wire's temperature coefficient which is $+0.004/°$ C. If adjustment of the magnetic field is desired when use of the solenoid coil is not permitted, it can be attained by adjustably mounting a ring shaped member 19 of magnetic material on the glass envelope 16. Movement of the ring 18 or 19 up or down will vary the overall force of attraction between member 1 and magnet 5. The solenoid coil 18 or the ring shaped member 19 of magnetic material should be fixed by means of a bonding material during the first inspection of the device after it is fully assembled.

A thermistor element (not shown) can be provided outside the glass envelope and can be connected in series with the ferrimagnetism thermistor, so that the thermistor passes current in proportion to the ambient temperature, thereby enabling operation of the switch at a predetermined temperature.

Regulation of the gap between the magnet 5 and the magnetic electrode 1 to close tolerance is also useful.

The solenoid coil 18 or the external magnetic ring 19, whichever is used, must be selected so as to suit the following two objects:

(1) Correction of magnetic field (for temperature)
(2) Timing control

The graph of FIG. 6 shows curves in which the characteristics of one example of the device insofar as it is affected by the ambient temperature are shown to be improved when placed in a vacuum. In the drawing, the curve O shows the characteristics of the device as operated in air, P as operated in a vacuum of $2\times10^{-2}$ mm. Hg, and Q as operated in a vacuum of $2\times10^{-6}$ mm. Hg, which device was corrected with a magnetic ring.

The thus constituted magnetic control tube can be manufactured by a production procedure similar to that for conventional vacuum tubes by preliminary evacuation of occluded gas, and at the same time has the advantages of timing equipment having a resistor with a negative magnetic temperature coefficient.

What is claimed is:

1. A magnetic control tube, comprising an evacuated glass envelope, lead wire pins extending through said envelope, a permanent magnet movably mounted in said envelope, a ferrimagnetism-thermistor having a negative temperature coefficient of magnetism fixedly mounted in said envelope adjacent said movably mounted magnet and toward which said magnet is attracted by the magnetic attraction force between said magnet and said thermistor, said ferrimagnetism-thermistor being electrically coupled between two of said pins, a spring bearing against the said magnet and urging it way from said thermistor against the attraction force, and at least one pair of contact elements one of which is mechanically coupled to said magnet and movable between two positions when said magnet moves, one of said positions being a closed contact position and the other being an open contact position, said contact elements being electrically coupled between two of said pins other then the aforementioned pins.

2. A magnetic control tube as claimed in claim 1 in which said ferrimagnetism-thermistor comprises a body of sintered oxidized solid state material having a negative temperature coefficient of ferrimagnetism and electrical resistance, and mainly comprising $Fe_2O_3$ and at least one transition metal which can form divalent ions, and zinc, and wherein the solid state material is present in stoichiometric proportions and is totally diffused.

3. A magnetic control tube as claimed in claim 1 further comprising a thermistor element outside of said envelope and connected in series with the ferrimagnetism thermistor within said envelope, whereby the external thermistor passes current in proportion to the ambient temperature, thereby enabling operation of the switch at a predetermined temperature.

4. A magnetic control tube as claimed in claim 1 in which the glass envelope is shaped as a cylindrical tube, and a ring shaped solenoid coil on the outside of said tube adjacent said magnet and thermistor for adjusting the characteristics of the thermistor and magnet from outside the glass envelope.

5. A magnetic control tube as claimed in claim 1 in which the glass envelope is shaped as a cylindrical tube, and a ring of pure iron on the outside of said tube adjacent said magnet and thermistor for adjusting the magnetic characteristics of the thermistor and magnet from outside the glass envelope.

References Cited
UNITED STATES PATENTS 2,751,483   6/1956   Keen et al. _____ 200—88

BERNARD A. GILHEANY, *Primary Examiner.*

R. N. ENVALL, *Assistant Examiner.*